Figure 1:
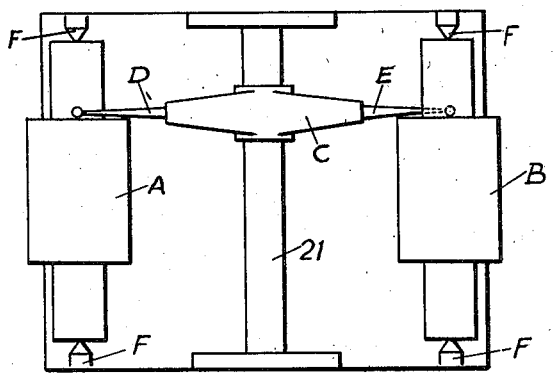

Dec. 30, 1947.  A. H. F. BOWNESS  2,433,421
MULTIPLE DIMENSION GAUGING APPARATUS
Filed Jan. 6, 1945  8 Sheets-Sheet 1

Inventor
Angus H. F. Bowness
by Mawhinney & Mawhinney
Attorneys

Dec. 30, 1947. A. H. F. BOWNESS 2,433,421
MULTIPLE DIMENSION GAUGING APPARATUS
Filed Jan. 6, 1945 8 Sheets-Sheet 2

Inventor
Angus H. F. Bowness
by Mawhinney & Mawhinney
Attorneys

Inventor
Angus H. F. Bowness
Mawhinney & Mawhinney
Attorneys
by

Inventor
Angus H. F. Bowness
by Mawhinney & Mawhinney
Attorneys

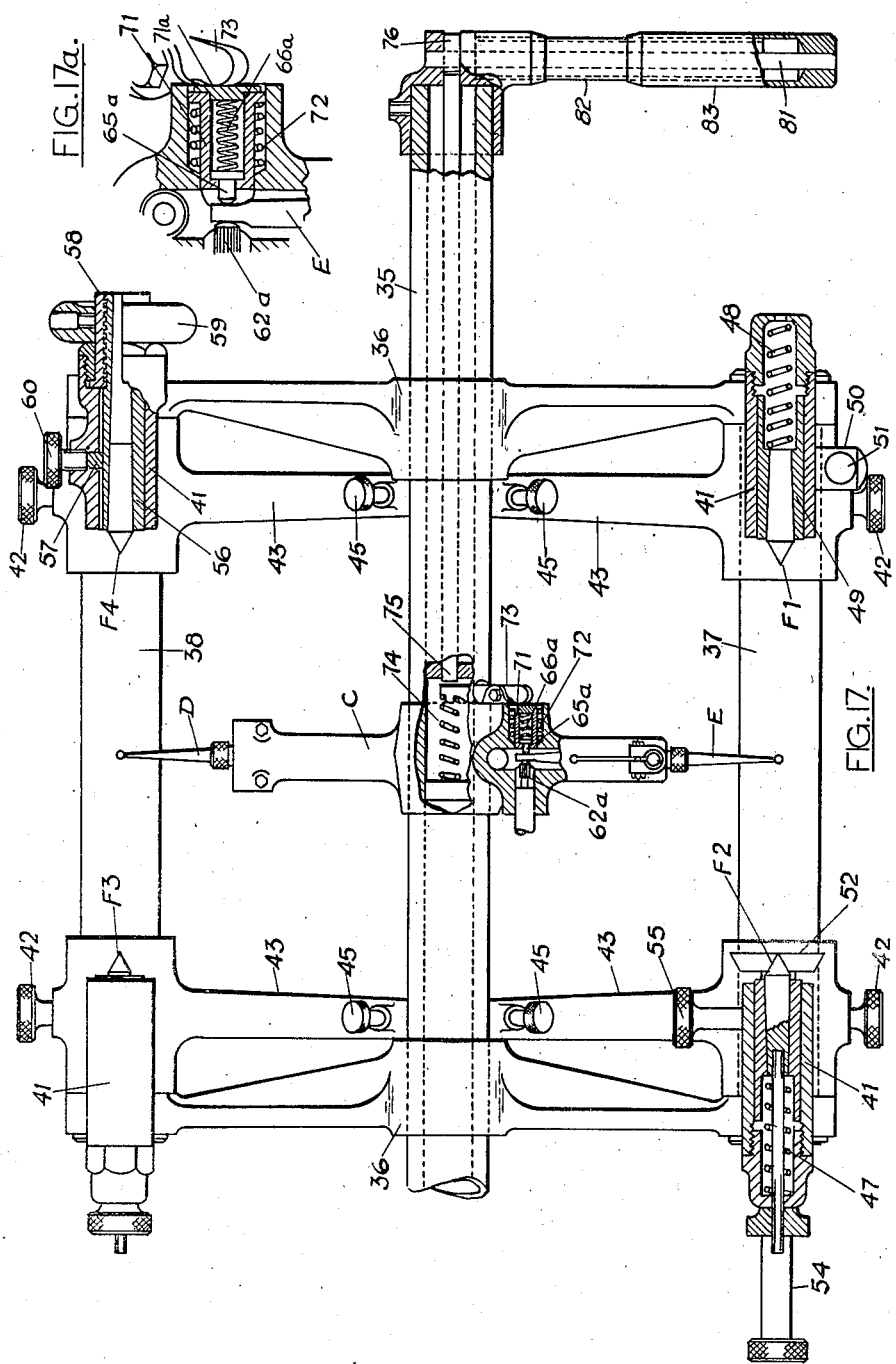

Dec. 30, 1947.  A. H. F. BOWNESS  2,433,421
MULTIPLE DIMENSION GAUGING APPARATUS
Filed Jan. 6, 1945  8 Sheets-Sheet 7

Inventor
Angus H. F. Bowness
by Mawhinney & Mawhinney
Attorneys

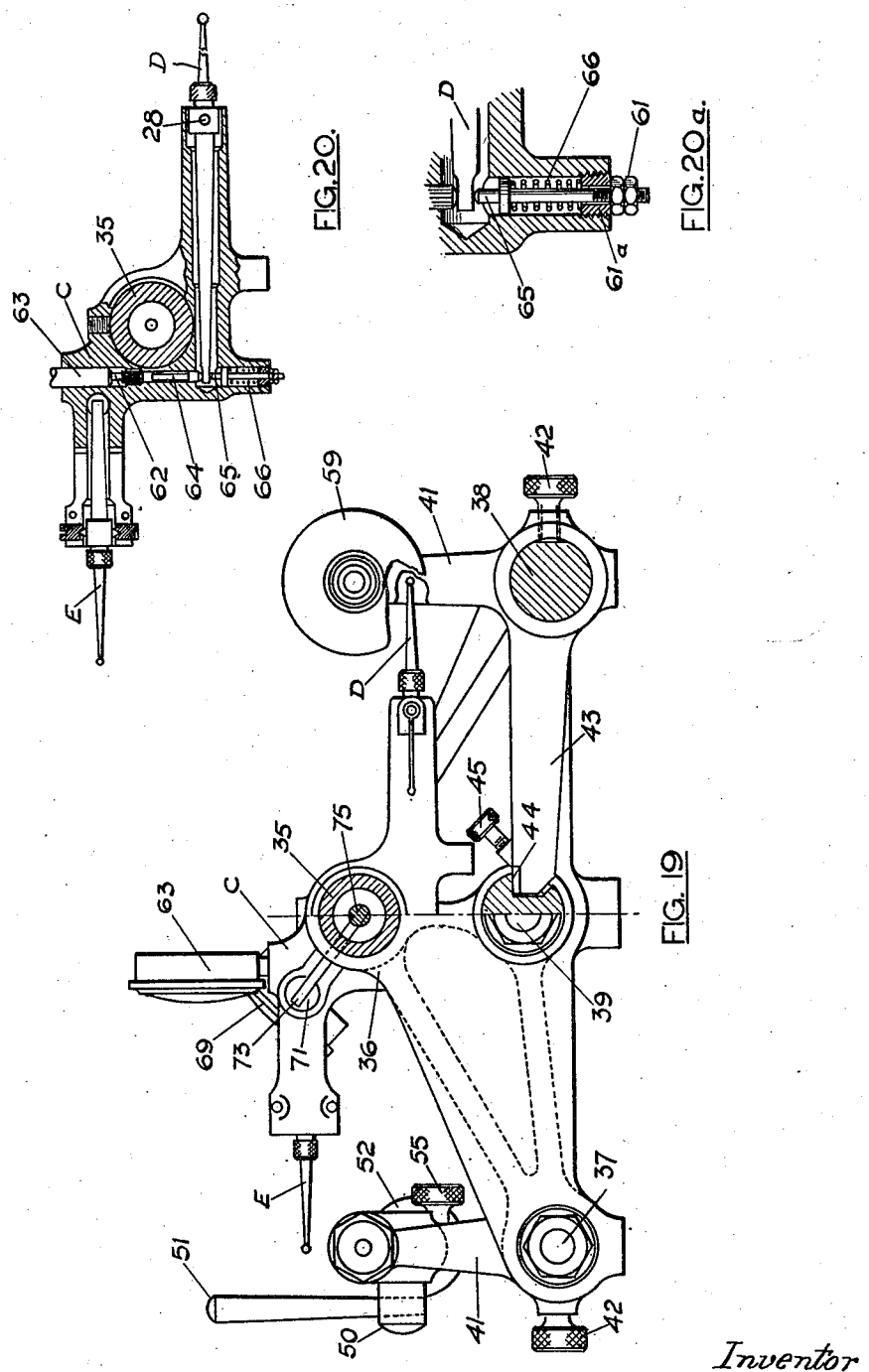

Patented Dec. 30, 1947

2,433,421

UNITED STATES PATENT OFFICE 2,433,421

MULTIPLE DIMENSION GAUGING APPARATUS

Angus Henry Farquhar Bowness, Leamington Spa, England

Application January 6, 1945, Serial No. 571,639
In Great Britain November 23, 1943

Section 1, Public Law 690, August 8, 1946
Patent expires November 23, 1963

3 Claims. (Cl. 33—179.5)

My main object is to provide an improved linear dimension gauging apparatus (for use, for example, in production shops, and particularly in inspection) which can be used for gauging a number of different dimensions and thus avoid the necessity for a number of independent gauges.

The apparatus is designed primarily to gauge a number of lengths and/or diameters, if the component is cylindrical, without separate gauges. It can also be used to check the concentricity of a number of diameters along the length of a component, or profiles of cams if suitable means are provided for rotating the master cam and component cam in unison. It is also applicable to machines such as lathes or grinding machines for checking components when they are actually in the machine. Furthermore, with the gauging apparatus of the invention time is saved and the gauging can be carried out in a very simple manner with accuracy.

The apparatus of the invention comprises means for supporting in fixed relationship (i. e., with their axes either collinear or else parallel) a component to be gauged and at least one master (for example, a standard, in some cases a template, or of course, a component which is sufficiently accurate); and means for supporting a member which is movable in two different directions essentially at right-angles to one another, one direction being parallel to the axes of the component and master. This member carries parts such as pointed elements (hereinafter referred to by the term styli) one of which at least is movable independently of the movement of the member and arranged by its movement to actuate, when contact is made with the master and component, an appropriate form of indicating means (for example, a dial-type gauge, electric indicating lamp or pitched buzzer).

The invention also covers the converse arrangement in which the said member is fixed and the master and component are movable in unison relatively to the axis thereof.

In some cases an apparatus may be required only to measure, say, radial dimensions, in which event it will be satisfactory for only one of the styli to be movable about a fixed axis of the said member. But in most cases it will be preferable that the apparatus should be capable of gauging both, say, axial dimensions and radial dimensions, and in this event both the styli are conveniently mounted for movement, either pivotally (in which case the styli are mounted for movement about axes at right-angles to one another) or slidably (in which case the longitudinal axis of one stylus moves at right-angles to the longitudinal axis of the other). In all cases a stylus which is free to move independently of the member is associated with its own indicating means.

Alternatively, one of the styli may be fixed with respect to the member, the other stylus being capable of movement in two directions at right-angles to one another, to actuate two indicating means separately. This can be done by means of a spherical type bearing suitably guided, or by two slides.

As another alternative one stylus (the other being fixed) could be plainly pivoted or slidably mounted in a bearing which itself is rotatable so that the stylus is capable of movement in either of two directions essentially at right-angles to one another.

Figure 2:
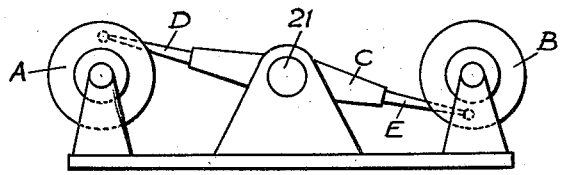
Figure 3:
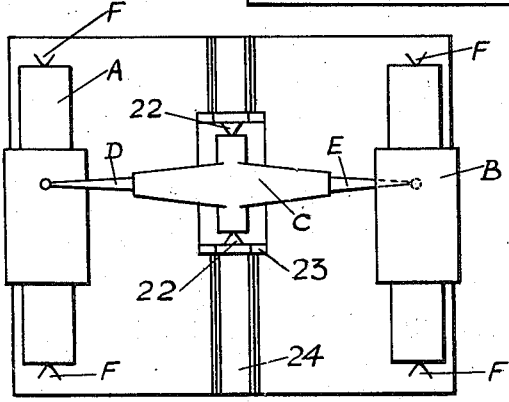
Figure 4:
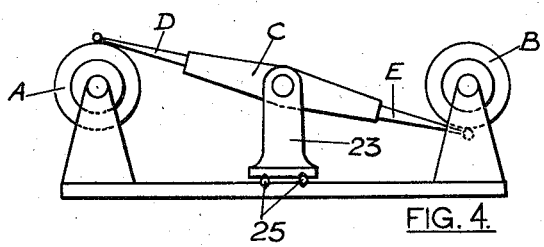
Figure 6:
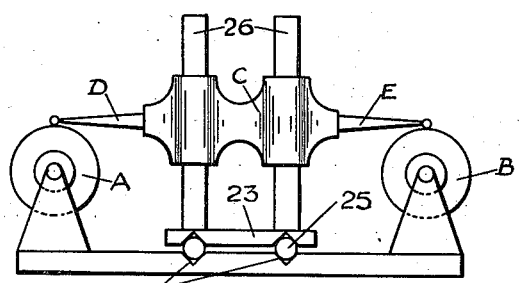
Figure 5:
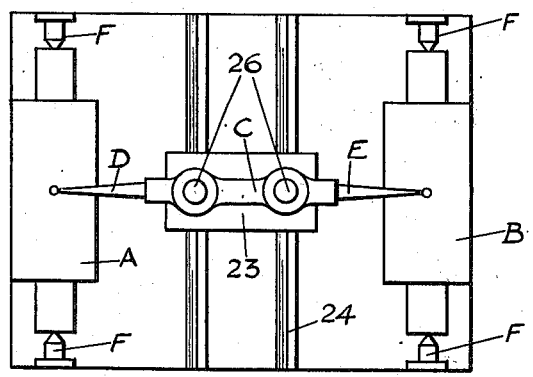
Figure 8:
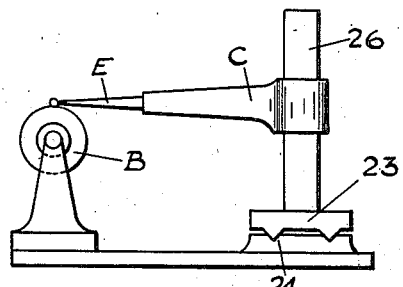
Figure 7:
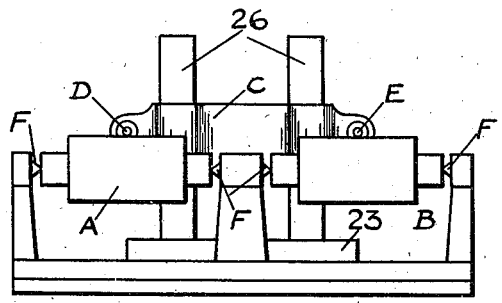
Figure 10:
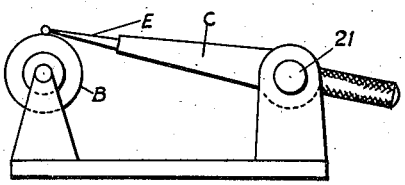
Figure 9:
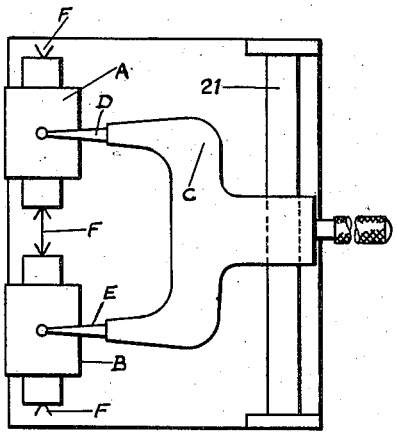
Figure 12:
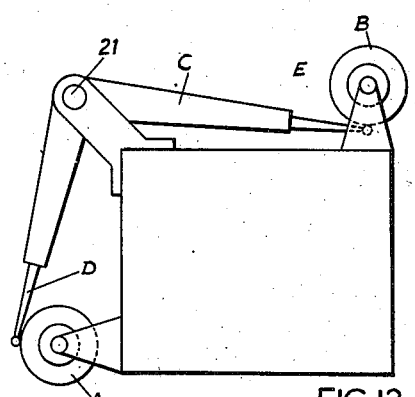
Figure 11:
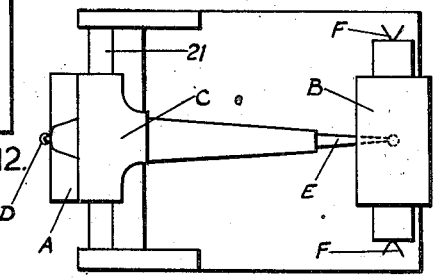
Figure 14:
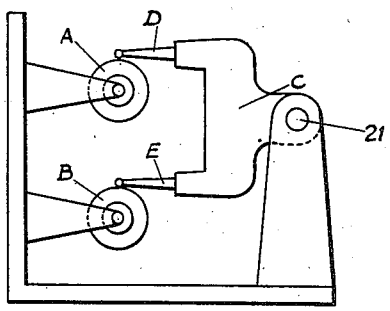
Figure 13:
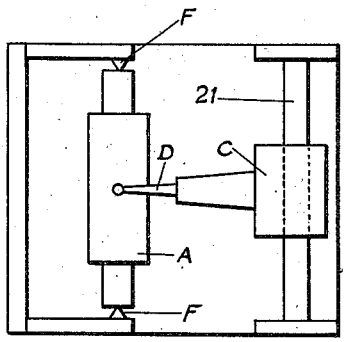
Figure 15:
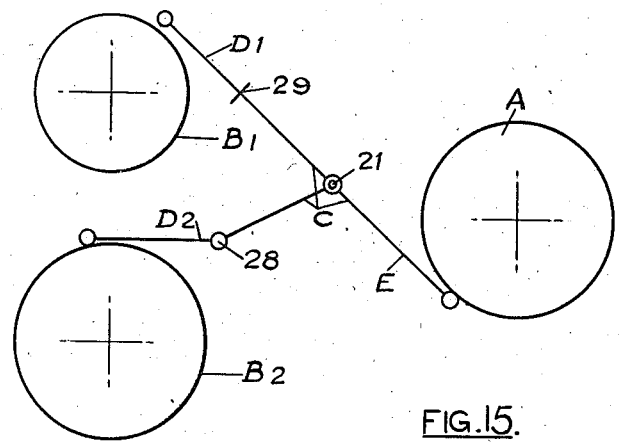
Figure 15A:
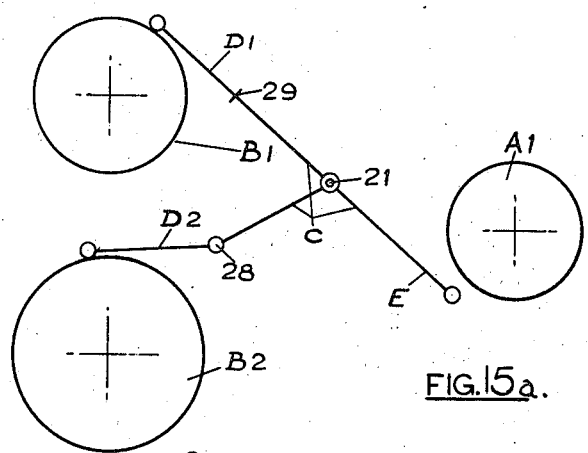
Figure 15B:
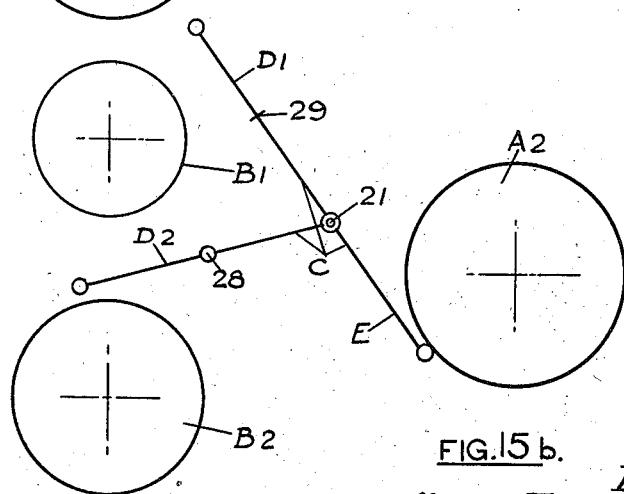
Figure 16:
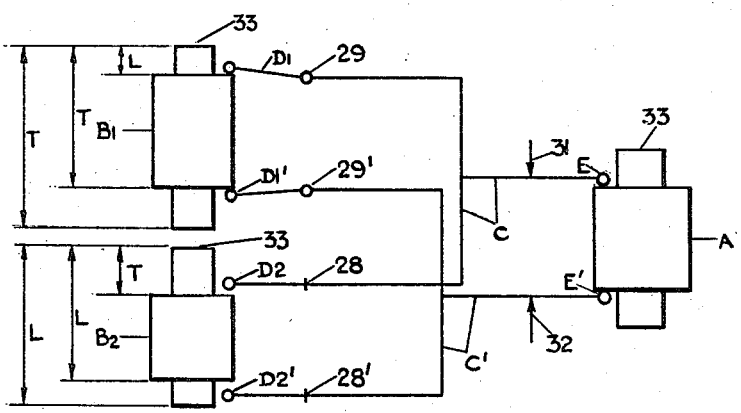
Figure 16A:
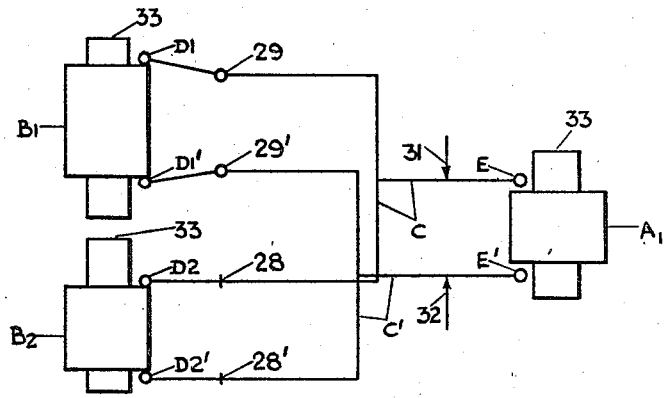
Figure 16B:
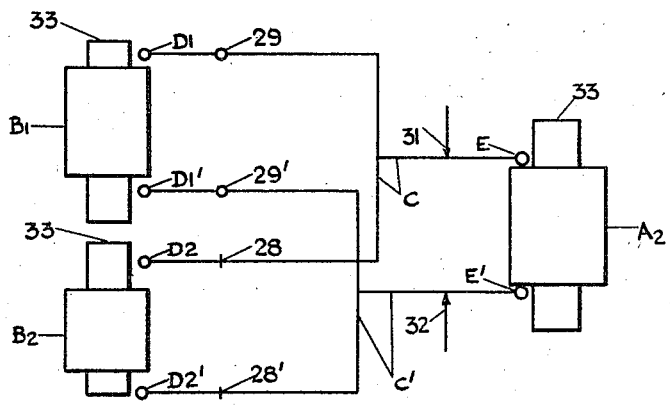

The nature of the invention will be better understood from the following description in which reference is made to the accompanying drawings. In these Figures 1 to 16 are diagrams pictorially showing eight different arrangements. Figures 1 and 2 are a plan and end elevation of one arrangement. Figures 3 and 4 are a plan and end elevation of a second. Figures 5 and 6 are a plan and end elevation of a third. Figures 7 and 8 are side and end elevations of a fourth. Figures 9 and 10 are a plan and end elevation of a fifth. Figures 11 and 12 are a plan and end elevation of a sixth. Figures 13 and 14 are a plan and end elevation of a seventh. Figures 15, 15a and 15b are end elevations showing another arrangement when associated with a component which is of the correct size, undersize and oversize respectively, whilst Figures 16, 16a and 16b are plans of the same arrangement as applied for the axial gauging of a component which is the correct size, undersize, and oversize respectively. (For purposes of illustration the high- and low-limit masters are incorrectly shown as being in line in Figures 16, 16a, and 16b.)

Figure 18:
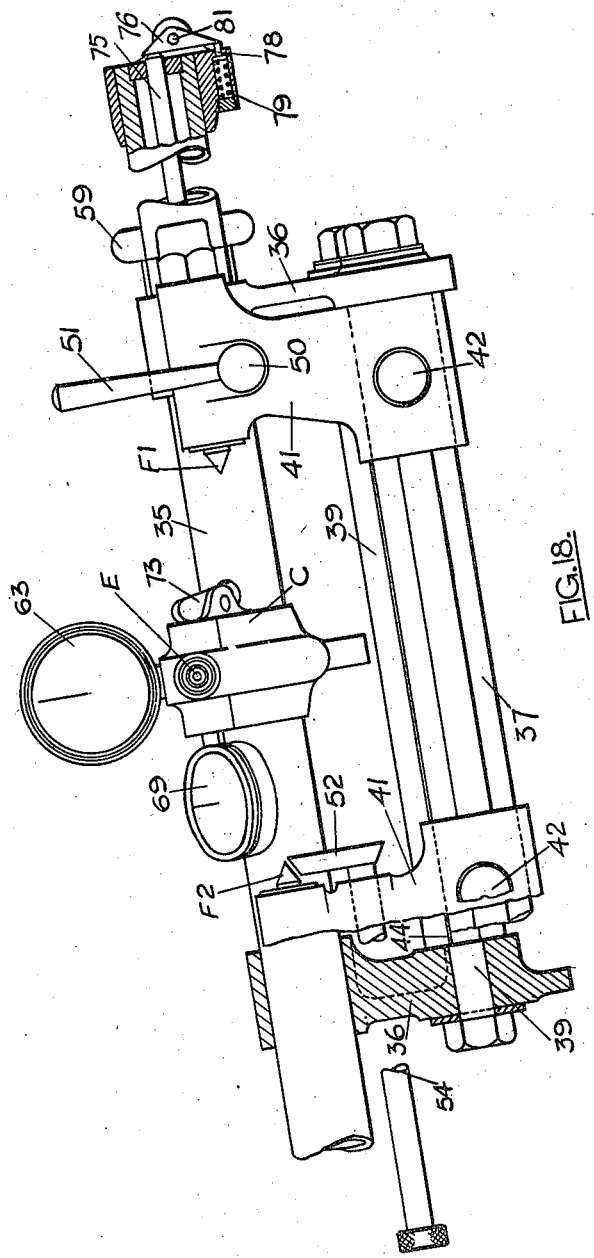

A preferred construction, similar to that of Figures 1 and 2, is shown in detail in Figures 17 to 20, in which Figure 17 is a part-sectional plan, Figure 17a a detail to a larger scale of the setting device for the stylus gauging axial dimensions, Figure 18 a part-sectional side elevation (the various sections, however, being taken about different centre lines), Figure 19 a part-sectional end elevation (taken from the right of Figure 17), Figure 20 a cross section through the said movable member, and Figure 20a a detail to a larger scale of the method of pre-setting the stylus serving for gauging diameters.

In all the diagrams, and also in Figures 17 to 20 to some extent, the same reference characters are used to denote similar parts. Thus, the component to be gauged is marked A, the master is marked B, and the aforesaid movable member is marked C, whilst, of the two styli, one marked D is movable about a horizontal axis (i. e., in a vertical plane to gauge for diameters), and the other marked E, is movable about a vertical axis. Centres for supporting the master and the component are indicated by F, and obviously male centres are not essential. For example, the centres could, if preferred, be in the form of chucks.

Although the stylus D (horizontal axis) is shown as associated with the component in the diagrams, it could, of course, coact with the master, the stylus E (vertical axis) then coacting with the component—as in the case of Figures 17 to 20.

It may here be stated that the distance from the axis of the member C to the contacting points of the styli is relative to the spacing of the master or masters and component to the same axis.

In the construction of Figures 1 and 2, the member C is journalled upon and slidable along a rod 21 the axis of which is parallel to the axes of the component and master. For measuring an axial dimension, as shown, the member C is slid along the rod 21 until one of the styli engages the appropriate face, and movement of the stylus E (vertical axis) can actuate the associated indicator (not shown) dependently upon the extent to which the component is not correct. The member C can be rocked upon the shaft 21 for gauging radial dimensions, in which case it is the stylus D which can actuate its associated indicator. Full particulars of the accurate gauging methods of this apparatus are given below in connection with Figures 17 to 20.

In the arrangement of Figures 3 and 4, the member C is mounted between centres 22 carried by a slide 23 which is itself supported from a guide 24 on the base by anti-friction means 25, by which it can be moved in a direction parallel to the axes of the master and component, the axis of the centres 22 being, of course, parallel to these axes.

Instead of the member C being rockable about an axis parallel to the axes of the master and component it may, as shown by Figures 5 and 6, be vertically guided, as by means of pillars 26 fast with a slide 23 supported from the base by a guide 24 for movement in a direction parallel to the axes of the component and master. The weight of the member C is in this case preferably taken by a spring (not shown). (In this construction the master could be in the form of a template.)

In the construction of Figures 7 and 8, in which the component and master are coaxial, the member C is mounted for vertical movement upon pillars 26, somewhat as described above in connection with Figures 5 and 6, the pillars again being carried by a horizontally slidable base 23.

Figures 9 and 10 show an obvious alternative to that of Figures 7 and 8, in which the member C is slidably supported and rockable upon a shaft 21 the axis of which is parallel to that of the master and component.

In Figures 11 and 12 the master and component are shown as being supported from faces which are at right-angles to one another, and in this case the member C is shaped somewhat like a bell-crank lever, being again pivotally mounted and slidable upon the rod 21, the axis of which is parallel to those of the master and component.

Or, as shown by Figures 13 and 14, the master and component may be arranged one above another, the member C again being rockable upon, and slidable along, a rod 21 the axis of which is parallel to those of the master and component and which forms therewith in end elevation (Figure 14) an isosceles triangle of which the axis of the rod 21 is the apex.

In all cases where the member C is pivotally mounted between the master and component its pivotal axis is at an equal distance from the axes of the component and master. This is necessary if the master is made to the correct size of the component.

Instances may occur when, for greater accuracy it is desirable to have a larger master—say twice full size. Then the distance of the pivotal axis of the member C from the axis of the component and master would have to be adjusted accordingly.

In some cases instead of making use of a dial-type or other gauge to indicate the extent to which a component is of the incorrect size, it will be satisfactory merely to record the fact that a certain dimension of the component is not within the required tolerance when such is the case. In a convenient method of carrying out such an arrangement, as shown by Figures 15 and 16, I make use of two masters B1 and B2. B1 is made to low-limit and B2 to high-limit for all radial dimensions. For axial checks all measurements are recorded from a predetermined datum face, preferably an end face, and the master B1 is made to low limit for the controlling dimension for faces which face this datum, and high-limit for the faces which face away from the datum. B2 is made to high-limit for dimensions which are low-limit on B1, and vice versa. Obviously it will be required to set the datum faces of the masters B1 and B2, also the datum face of the component level, before the gauging operation takes place.

In the arrangement of Figures 15, 15a and 15b, where the component A is to be gauged for radial dimensions, the said member C pivoted at 21 has two hinged styli D1 and D2 to coact respectively with the masters B1 and B2, the stylus D2 being hinged for movement about a horizontal axis 28 (i. e., being movable in a vertical plane) while the stylus D1, which is hinged for movement about a transverse (generally vertical) axis 29, may from the point of view of this gauging operation be regarded as integral with the rest of the member C and the stylus E. The radial spacing of the three styli in relation to the axis 21 of the member C is similar to the radial spacing between the axes of the masters or component they contact. Also the axes of the two masters and the component being gauged must be equidistant from the axis 21 of the member C if the masters B1 and B2 are correct size (i. e., within drawing limits).

Figure 15 indicates that the component A is within the required limits, two styli D2 and E contacting the appropriate surfaces, while D1 does not, and, as will be well understood, a green or other electric lamp may be connected in circuit through the high-limit master B2 and the component A so as to be illuminated in these conditions.

If the component is undersize as shown at A1 in Figure 15a the stylus E will not contact its associated surface but styli D1 and D2 make contact. If desired the two masters B1 and B2 may be connected through a red or other electric lamp which, when illuminated, will indicate that the component is undersize.

In Figure 15b, in which the component A2 is oversize, the stylus E is the only one of the three to contact its associated surface, and a circuit could be arranged for an appropriate electric lamp to be illuminated in these conditions to indicate that the component to be gauged is oversize. In most cases it will, however, be satisfactory to have just a single lamp which will be illuminated when the component is within the required radial tolerance.

The measurement of axial dimensions is dealt with in Figures 16, 16a and 16b and these three figures show the member C and associated parts with plain references when being moved in the direction of arrows 31 and with prime references when being moved in the direction of the arrows 32. Due to the disposition of high- and low-limit axial dimensions on the two masters B1 and B2 the same contacts are made on components having similar errors irrespective of whether the movement is in the direction of the arrow 31 or 32. The parts being checked can be segregated as correct, oversize (i. e., capable of correction) or undersize (incapable of being corrected).

The datum faces are marked 33, and all three of these faces must be set level with respect to the styli. With regard to the master B1 (the low-limit master for diameters), and with regard to the master B2 (the high-limit master for diameters), L represents in each case a low-limit axial dimension from the datum face and T a top-limit axial dimension.

Figure 16 shows a component A which is correct (i. e., between the prescribed limits for the dimension involved), the styli E and D1 both making contact with the coacting surfaces whilst the styli D2 is out of contact. Similarly when movement occurs in the direction of the arrow 32 styli E' and D1' contact whilst D2' does not.

An electric circuit may be arranged to include an appropriate signalling lamp which will be energized when the styli E and D1 both engage their associated surfaces.

In Figure 16a the component is undersize (i. e., too much metal has been removed from the faces involved) and the styli D2 (which, in this sliding movement can be regarded as being integral with the rest of the member C) and D1 have engaged their associated surfaces before the stylus E has effected engagement.

Again similar conditions apply when the movement is in the direction of the arrow 32 and an appropriate lamp could be illuminated to indicate that the component is undersize.

When the component is oversize (i. e., too much material has been left on the faces involved), as in the case of the component A2 of Figure 16b, the stylus E engages the appropriate surface before either of the styli D1 or D2 make contact. Similarly when movement is in the direction of the arrow 32 stylus E1' only makes contact and a signalling lamp can be placed in circuit to record this condition.

It will be understood the electric circuits can be considerably simplified since of Figures 15a and 16a, 15b and 16b, the same styli contact for similar conditions, whether for radial or axial dimensions.

Referring now to the detailed construction of Figures 17 to 20, in these the said member C is fast on a hollow shaft 35 which is journalled in two spaced stationary supports 36 for sliding and rotational movement therein. The stationary supports 36 are roughly of triangular shape, and they are rigidly connected with one another by bars 37, 38 at the two lowest apices of the triangle and, in addition, by a central bar 39, the three bars and the stationary supports constituting part of the stationary base. The rest of the stationary base consists of the centres F (which in these figures are marked F1 to F4) which are individually carried upon upright arms 41 having cylindrical sockets at their upper ends to receive them, the bases of the arms being adjustably mounted upon the bars 37 and 38, and they can be locked thereon by means of set-screws 42. Each upright arm 41 is integral with a lateral arm 43 which, as shown in part of the sectional view of Figure 19, adjustably engages in an appropriate recess 44 formed in the central bar 39, being locked against the upper gauging surface of this recess by means of a set-screw 45. In this way the centres are accurately positioned so that the axes of the two centres F1 and F2, and of F3 and F4, will be exactly parallel to one another, and to the axis of the shaft 35, and, in addition, roughly positioned so that the pairs of centres can be spaced from one another axially as required, that is, for a rough adjustment.

In this example, the centres F1 and F2 are to receive the component and the centres F3 and F4 the master. The centres F2 and F3 are similar to one another, both being pressed in the appropriate direction by means of a spring 47 except that the centre F2 carries in its upright column a stop, the purpose of which will be described later.

The centre F1 is pressed in the appropriate direction by a stronger spring 48, and in this case the slidable cylinder 49, in which the actual centre pivot is mounted, is formed on its underside with a rack engaged with a pinion or toothed quadrant (not shown) on a spindle 50 journalled in the arm 41 and provided with an operating handle 51.

When a component of a new batch is to be gauged the procedure is as follows: The operating handle 51 is swung to the right (Figure 18) to retract the centre F1 and allow the component to be inserted, and it is then released, the springs 47 and 48 then serving for supporting the component between the centres F1 and F2. A limit stop 52, which is adjustable lengthwise, so that various faces can be used as a datum, and which is eccentrically mounted (as shown by Figure 18) on a slidable spindle 54 adapted to be manually operated, is then set up adjacent the centre F2 against a datum face of the component and then locked in position by means of a set-screw 55 (see Figure 19).

The centre F4 is carried by a cylinder 56 which is not spring-pressed but is slidably guided in the socket of the arm 41 and prevented from rotating by means of a key 57 engaged in an appropriate key-way, and the cylinder has a screw-thread upon it engaged with an internal screw-thread of a nut 58, provided with an operating hand-wheel 59, which is rotated upon the cylinder 56. On rotating the hand-wheel 59 in the appropriate direction to withdraw the centre F4, a master can be inserted and the hand-wheel 59 then turned in the other direction until the datum face of the master is set up to be in line with the stop 52 (by use of the stylus gauging axial dimensions) and with the datum face of the component. Thereupon the centre F4 is locked in position, as by means of the screw 60, and the gauging of the component can take place.

After the component has been gauged the quick-release handle 51 is operated to the right (Figure 18) and a fresh component can be inserted, the spring 48 associated with the centre F1 biassing the component until its datum face engages the stop 52 (which, incidentally, is shown in Figures 17 and 18 in a withdrawn position), after which the fresh component can be gauged without, of course, any further adjustment of the master.

The stylus D (see Figure 20) is pivotally mounted for movement about a horizontal axis 28 (i. e., for movement in a vertical plane), and it is shown as working with a two-to-one leverage upon the slidable element 62 of a dial-type gauge 63 through a plunger 64, so that errors of diameter and not radius are recorded.

Opposed to the other side of the inner end of the stylus is a plunger 65 pressed by a spring 66 which is slightly stronger than that of the dial indicator itself. A screwed extension formed on the plunger 65 carries two lock nuts 61 which butt on the face of the spring-retaining screw 61a due to the pressure of the spring 66. By adjustment of these two nuts it is thus possible to give the stylus an initial set—say thirty thous. (towards the axis of the centres F3 and F4). Consequently when components which are undersize are being gauged the amount of undersize can be recorded.

The stylus D, it will be observed, is arranged to contact the underside of the master and the stylus E which, from the point of view of gauging radial dimensions may be regarded as being integral with the member C, engages the top of the component.

If the component is well oversize, the stylus E will engage it and the stylus D will not engage the master; but the stylus has been set (as previously described) to show an oversize reading of thirty thous. on the dial gauge.

In these conditions, the component will be rejected.

If the component is oversize to an extent less than the above-mentioned thirty thous., then the stylus D will engage the master and the gauge will be operated to read the extent to which the component is oversize, and the component may be rejected or allowed depending upon the allowable tolerance. If the component is exactly correct the gauge will read zero. Conversely, if the component is undersize the gauge will be further operated to read the extent by which it is undersize, and the component will be rejected or accepted dependently upon the allowed tolerance.

When measuring axial dimensions the same principle applies, but the gauge cannot, of course, be pre-set in a simple manner, as the movable member C may approach the radial face to be axially gauged either from the right (Figures 17 and 18) or from the left. To allow for this the gauge 69 has its movable plunger 62a engaging one face of the inner end of the stylus E (see Figure 17), and the other face of the latter is again engaged by a plunger 65a pressed against a stop by a spring 66a which is stronger than that of the gauge, whereby the stylus is biased to a neutral position in which the gauge in this case indicates zero.

The stop is contained in a slidable hollow flanged plunger 71 (see Figure 17a) the flange of which is engaged and pressed outwardly by a spring 72, whilst the head 71a of the plunger is engaged by a rocking lever 73 the other end of which engages a stronger spring 74 disposed in the interior of the member C. Slidably disposed in the shaft 35 is a rod 75 engaging the other face of the inner end of the rocking lever 73, and the outer end of the rod 75 coacts with a lever 76 (see Figure 18) having limited rocking movement. The lever is pressed to a neutral position as shown (in which the gauge reading is zero) by a spring-pressed plunger 78, the spring 79 being stronger than the spring 74 and biassing the plunger 78 against a stop. The lever is mounted on a spindle 81 which extends along the interior of an arm 82 fast with the shaft 35 and serving for the axial movement and for the rotation thereof, and the arm 82 has upon it a handle 83 which is fast with the spindle 81 and which is rotatably mounted.

Turning the handle 83 in one direction causes the lever 76 to push the rod 75 inwardly, thereby rocking the lever 73 in a direction such as will allow of the withdrawal of the plunger 71 (providing a stop for the plunger 65a) as a whole, thereby moving the stylus E and the plunger 62a of the gauge 69 to a position in which the gauge registers, say, thirty thous. on one side of the zero position. The axial dimension of the component can then be gauged, in the manner described above, for one direction of movement of the member C.

Conversely, if one is approaching the radial face of the component from the other direction, then the handle 83 is twisted in the other direction to compress the spring 79 and to allow the rod 75 to move outwardly under the bias of the spring 74, which, being stronger than the spring 72, will position the plunger 71 and the plunger 65a as a whole so as to cause the gauge 69 to read, say, thirty thous. from zero in the other direction.

What I claim as my invention and desire to secure by Letters Patent of the United States is:

1. A gauging apparatus having means for supporting a component to be gauged, a master, means for supporting said master along an axis in parallel relationship to said component, a member which carries styli adapted to engage the component and master, respectively, said member being mounted to be slidable in a direction which is parallel to the axes of said component and master, and in addition to be rockable about its slidable axis, said styli being mounted to be movable with respect to said member, one of said styli being movable in the direction of said axes and the other in a direction which is essentially at right-angles thereto, and indicating means arranged to be actuated respectively by such movement of said styli.

2. A gauging apparatus having means for supporting a component to be gauged, a master, means for supporting said master along an axis in fixed parallel relationship to said component, a member which carries styli adapted to engage the component and master, respectively, said member being mounted to be movable in two different directions which are essentially at right-angles to one another and one of which is parallel to the longitudinal axes of said component and master, one of said styli being mounted and movable with respect to said member and parallel to one of said directions and another stylus mounted on said member and movable in the other of said directions, and indicating means arranged to be actuated respectively by such movements of said styli.

3. A gauging apparatus having means for supporting a component to be gauged, a master, means for supporting said master along an axis substantially parallel and in fixed relationship to said component, a member which carries styli adapted to engage the component and master, respectively, said member being mounted to be movable in two different directions which are essentially at right-angles to one another and one of which is parallel to the axis of said component and master, one of said styli being mounted and movable with respect to said member and parallel to one of said directions and another stylus mounted on said member and movable in the other of said directions, means biassing said one stylus to a neutral position against a stop, and a spring controlled dial-type gauge arranged to be actuated by such movement of said stylus, said biassing means being stronger than the spring of said gauge.

ANGUS HENRY FARQUHAR BOWNESS.

REFERENCES CITED

The following references are of record in the file of this patent:

UNITED STATES PATENTS

| Number | Name | Date |
|---|---|---|
| 1,084,155 | Lochman | Jan. 13, 1914 |
| 1,254,062 | Olson et al. | Jan. 22, 1918 |
| 1,701,184 | Hansen | Feb. 5, 1929 |
| 2,202,638 | Praeg | May 28, 1940 |